US011797555B2

(12) United States Patent
Badrinath et al.

(10) Patent No.: US 11,797,555 B2
(45) Date of Patent: Oct. 24, 2023

(54) METHOD FOR COPYING SPANNER DATABASES FROM PRODUCTION TO TEST ENVIRONMENTS

(71) Applicant: Google LLC, Mountain View, CA (US)

(72) Inventors: Srinath Badrinath, Bangalore (IN); Carlos Arguelles, Edmonds, WA (US); Danhao Guo, San Mateo, CA (US); Benson Margulies, Seatlle, WA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/555,666

(22) Filed: Dec. 20, 2021

(65) Prior Publication Data

US 2023/0195741 A1    Jun. 22, 2023

(51) Int. Cl.
    *G06F 15/16*      (2006.01)
    *G06F 16/25*      (2019.01)
    *G06F 9/48*      (2006.01)
    *G06F 16/21*      (2019.01)
    *G06F 16/27*      (2019.01)

(52) U.S. Cl.
    CPC ............ *G06F 16/25* (2019.01); *G06F 9/4881* (2013.01); *G06F 16/214* (2019.01); *G06F 16/27* (2019.01)

(58) Field of Classification Search
None
See application file for complete search history.

(56) References Cited

U.S. PATENT DOCUMENTS

| | | | | |
|---|---|---|---|---|
| 10,324,911 | B1* | 6/2019 | Smirnov | G06F 16/2255 |
| 11,016,954 | B1* | 5/2021 | Babocichin | G06F 16/258 |
| 2007/0130116 | A1* | 6/2007 | Cras | G06F 16/283 |
| 2017/0116220 | A1* | 4/2017 | Wong | G06F 11/1471 |
| 2017/0353536 | A1* | 12/2017 | Shraer | G06F 9/5088 |
| 2017/0364582 | A1* | 12/2017 | Pan | G06F 16/2282 |
| 2021/0279354 | A1* | 9/2021 | Gandhi | G06F 16/284 |
| 2021/0406229 | A1* | 12/2021 | Taranov | G06F 16/2246 |

OTHER PUBLICATIONS

Corbett, et al., Spanner: Google's Globally-Distributed Database, Published in the Proceedings of OSDI, 2021, 14 pages.
Yong. Database Migration Systems: an Overview. Jun. 28, 2021 (Jun. 28, 2021), Retrieved from the Internet: <https://bruceoutdoors.wordpress.com/2021/06/28/database-migration-systems-an-overview/>. 8 pages.

(Continued)

*Primary Examiner* — Alex Gofman
(74) *Attorney, Agent, or Firm* — Lerner David LLP

(57) ABSTRACT

A method of copying a production database to a test environment using one or more processors. The production database includes a plurality of tables and one or more constraints indicating interleaving of the plurality of tables. The method involves constructing a directed acyclic graph (DAG) of the plurality of tables, whereby each table is represented by a respective node of the DAG and interleaving of the tables is represented by edges of the DAG, topologically ordering the tables according to the DAG, and copying data from the production database to the test environment according to the topological ordering of the tables.

18 Claims, 5 Drawing Sheets

(56) References Cited

OTHER PUBLICATIONS

Bussler et al. Cloud Spanner's Table Interleaving: a Query Optimization Feature. Apr. 16, 2021 (Apr. 16, 2021), Retrieved from the Internet: <https://medium.com/google-cloud/cloudspanners-table-interleaving-a-query-optimization-feature-b8a8,059dal6>. 11 pages.
Elamparithi. Database Migration Tool (DMT)—accomplishments & future directions. Communication and Computational Intelligence (INCOCCI), 2010 International Conference on, IEEE, Dec. 27, 2010 (Dec. 27, 2010), pp. 481-485.
International Search Report and Written Opinion for International Application No. PCT/US2022/053467 dated Mar. 20, 2023. 14 pages.

* cited by examiner

| Root Table | Interleaved Table(s) | Key Range |
|---|---|---|
| A | B, E | |
| A | B, E | |
| A | B, E | 0x0000 |
| A | B, E, C | |
| A | B, E, C | ⋮ |
| A | B, E, C, D, G | 0x2000 |
| ⋮ | | |
| A | B, E, D, G, H | |
| A | B, E, D, G, H | |
| A | B, E, D, F, G, H | |
| A | B, E, D, F, G, H | |
| A | B, E, D, F, G, H | 0x2001 |
| A | C | |
| A | C | ⋮ |
| A | C | 0x5000 |
| ⋮ | ⋮ | |
| A | C, G, H | |
| A | C, G, H | |

● 
● 
●

| | | |
|---|---|---|
| A | D, G, H | |
| A | D, G, H | |
| A | D, G, H | 0xF001 |
| A | D, G, H | |
| A | D, G, H | ⋮ |
| A | D, G, H | 0xFFFF |
| ⋮ | ⋮ | |
| A | G, H | |
| A | G, H | |

METHOD FOR COPYING SPANNER DATABASES FROM PRODUCTION TO TEST ENVIRONMENTS

BACKGROUND

Integration testing for a database, such as a production database, can test the interaction between the database and various services and applications that interact with the database. This may be necessary to ensure proper integration between the database and one or more other interacting components, and may be performed for each new release of the interacting components.

Typically, in order to facilitate the testing, data from the database is copied over from the production environment to a separate test environment. However, this process can be very time consuming, depending on the size of the database and the program for copying the data over. Additionally, the production database may include multiple layers of abstraction due to interrelationships between the various tables of the production. Copying data from these tables in an arbitrary order may result in errors.

For instance, in the case of a globally-distributed database such as Spanner, which can be designed to scale up to millions of machines across hundreds of datacenters and trillions of database rows, data may be copied using Backup/Restore. But the Backup-Restore function is designed for handling infrequent scenarios, such as disaster recovery, and that throughput offered is low. As such, Backup/Restore is slow, unreliable, and results in timeout to many tests.

BRIEF SUMMARY

The present disclosure utilizes the abstraction layers of the production database or organize the production data and to systematically divide the data into approximately even or balanced portions to be copied in parallel to one another.

One aspect of the disclosure is directed to a method of copying a production database to a test environment, the production database comprising a plurality of tables and one or more constraints indicating interleaving of the plurality of tables, the method involving: constructing, by one or more processors, a directed acyclic graph (DAG), wherein each of the plurality of tables is represented by a respective node of the DAG and interleaving of the plurality of tables is represented by edges of the DAG; topologically ordering, by the one or more processors, the plurality of tables of the production database according to the DAG; and copying, by the one or more processors, data from the production database to the test environment according to the topological ordering of the plurality of tables.

In some examples, copying data from the production database to the test environment according to the topological ordering of the plurality of tables may include copying data from a root table of the plurality of tables before copying data from leaf tables of the plurality of tables.

In some examples, the method may include isolating, by the one or more processors, foreign key enforcement data from the one or more constraints of the production database, and reinserting, by the one or more processors, the foreign key enforcement data after copying the data from the production database to the test environment.

In some examples, the method may include assigning, by the one or more processors, a plurality of worker nodes to copy respective portions of the data from the production database to the test environment in parallel, and assigning, by the one or more processors, a respective key range to each of the plurality of workers, wherein each worker node is responsible for copying data from the plurality of tables of the production database within its respective key range.

In some examples, the method may include estimating a respective number of bytes-per-row for each of the plurality of tables of the production database, and determining a balanced distribution of key ranges among the plurality of worker nodes based on the estimated number of bytes-per-row for each of the plurality of tables.

In some examples, the balanced distribution of key ranges may be based further on a number of available worker nodes, and the balanced distribution of key ranges may split the data of the production database into a number of portions greater than or equal to the number of available worker nodes.

In some examples, the balanced distribution of key ranges may be based further on a preset value, and the preset value may indicate a desired key range between split points.

In some examples, the method may include generating, by the one or more processors, a progress table, monitoring, by the one or more processors, a progress of copying the production database to the test environment for each cell of the progress table, and in response to the monitored progress, rebalancing, by the one or more processors, at least one of the balanced distribution of key ranges or the assignment of the plurality of worker nodes.

In some examples, the method may include, for a given table of the test environment, writing data from the production database to a mutation pool associated with the given table of the test environment, and in response to a size of a transaction of the mutation pool's contents to the given table of the test environment meeting or exceeding a threshold transaction value, flushing the mutation pool.

In some examples, the production database may be a Spanner database.

Another aspect of the disclosure is directed to a system for copying a production database to a test environment, the production database comprising a plurality of tables and one or more constraints indicating interleaving of the plurality of tables, the system including: memory storing a representation of a directed acyclic graph (DAG), wherein each of the plurality of tables is represented by a respective node of the DAG and interleaving of the plurality of tables is represented by edges of the DAG; and one or more processors configured to: topologically order contents of the plurality of tables of the production database according to the DAG; and instruct a plurality of worker nodes to copy data from the production database to the test environment according to the topological ordering of the plurality of tables.

In some examples, the one or more processors may be configured to instruct each of the plurality of worker nodes to copy data from a root table of the plurality of tables before data from leaf tables of the plurality of tables.

In some examples, the one or more processors may be configured to: isolate foreign key enforcement data from the one or more constraints of the production database, and reinsert the foreign key enforcement data after the plurality of workers copy the data from the production database to the test environment.

In some examples, the one or more processors may be configured to: assign respective portions of the data from the production database to the plurality of worker nodes. Each respective portion of the data may correspond to an independent key range, and the independent key ranges may not overlap with one another.

In some examples, the one or more processors may be configured to: estimate a respective number of bytes-perrow for each of the plurality of tables of the production database, and determine a balanced distribution of key ranges among the plurality of worker nodes based on the estimated number of bytes-per-row for each of the plurality of tables.

In some examples, the one or more processors may be configured to determine the balanced distribution of key ranges based further on a number of available worker nodes. The respective portions of the data may be greater than or equal to the number of available worker nodes.

In some examples, the one or more processors may be configured to determine the balanced distribution of key ranges based further on a preset value. The preset value may indicate a desired key range between split points.

In some examples, the one or more processors may be configured to: generate a progress table indicating a progress of each of the plurality of worker nodes copying the plurality of tables, each cell of the progress table corresponding to a respective key range of the data, and rebalance the assigned respective portions of the data among the worker nodes based on the progress indicated by the progress table.

In some examples, the one or more processors may be configured to write data from the production database to a mutation pool. Each respective key range may be separately batched, and the mutation pool may be configured to flush the data written to the mutation pool to the test environment upon meeting or exceeding a threshold transaction value.

In some examples, the system may further include the plurality of worker nodes, and the plurality of worker nodes may be configured to operate independent of one another.

BRIEF DESCRIPTION OF THE DRAWINGS

FIG. 2 is an example table constructed by the system of FIG. 1 in accordance with an aspect of the present disclosure.

DETAILED DESCRIPTION

Overview

The present disclosure provides various methods and techniques for copying data from a production database, such as Spanner, to a test environment. The methods leverage the abstraction layers of the production database by building a directed acyclic graph (DAG) from the tables of the production database, whereby each respective table functions as a node and table interleaving represents the edges of the DAG.

One technique involves topologically ordering the nodes of the DAG according to the edges connecting the nodes. This may involve a root node being ordered first, with leaf nodes following after the root node according to the determined ordering. The ordered DAG may dictate an order for copying data from the production database to the test environment, which in turn may reduce errors, such as missing key errors, during the copying process.

Additionally or alternatively, a plurality of worker nodes may be assigned to copy the data in parallel, whereby the production data is balanced among the worker nodes. This enables faster and more efficient copying of the database. The balancing may be achieved by estimating the number of bytes-per-row for each table in the production database and dividing the table of the root node (including all of the interleaved tables of the leaf nodes) into approximately evenly distributed key ranges. The split points may be calculated based on the number of available worker nodes, whereby each worker node may be assigned an approximately equal size of the database to copy. Alternatively, split points may be computed in advance based on a predetermined size.

Additional techniques may be implemented to further improve efficiency of the assigned worker nodes. For instance, a control routine may be implemented to regularly monitor progress of the worker nodes, and to rebalance from one or more stalled or slowed worker nodes to one or more other operating worker nodes of the system in response to the monitored progress. Additionally or alternatively, a mutation pool may be implemented for writing copied data to the test environment in batches.

The methods described herein permit for data to be copied from a production database to a test environment with greater reliability, faster speed or both. This is especially beneficial for large-scale databases, in which current standards and benchmarks are prone to error and can slow down integration testing of an application or service using the database, thereby delaying its release.

Example Systems

Figure 1:
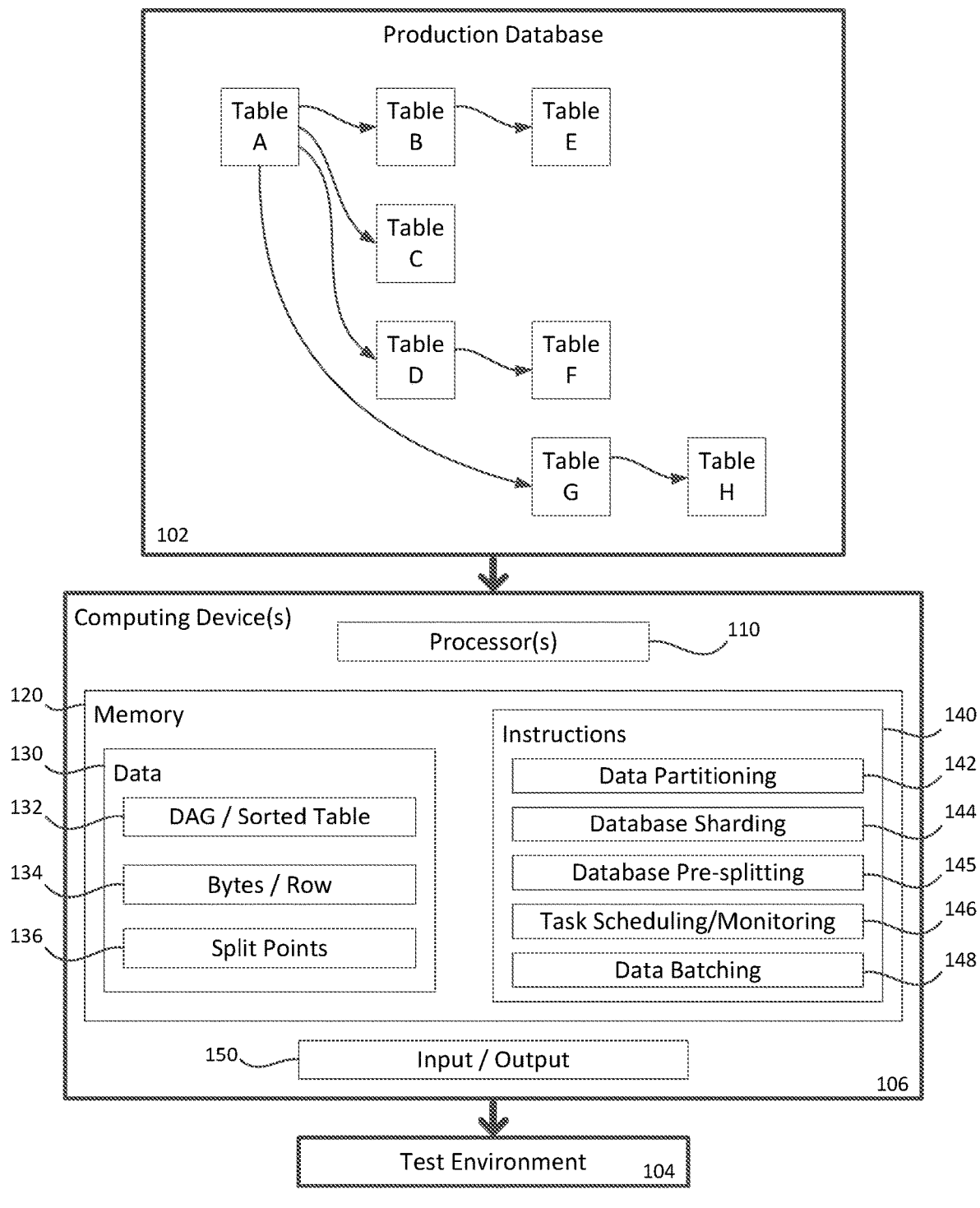
FIG. 1 is a block diagram of an example system in accordance with an aspect of the present disclosure.

FIG. 1 illustrates an example system 100 having a production database 102, a test environment 104, and one or more computing devices 106 configured to copy production data from the production database 102 to the test environment 106 for testing. Copying production data to a test environment may be useful for backup/restore operations for the production database, conducting integration testing, to conduct release testing, or any combination thereof.

The production database 102 may be housed at one or more servers which may be located at one or more locations. Production data stored at the production database 102 may be used to support operations of one or more services or applications. For instance, the production database 102 may include multiple tables, whereby at least some of the stored tables include data accessed by or entered from the related applications or services. The tables may be related to one another according to predefined schema. For example, one table may be linked to another table according to one or more foreign keys. For further example, specific rows of one or more tables may be interleaved within the specific rows of another table. These relationships may be used to define data integrity within the database, such that an incorrect data entry may be detected and avoided or corrected within the database quickly. The test environment 106 may be capable of conducting tests on the database contents to ensure data integrity.

In the example of FIG. 1, the production database 102 is shown to include eight tables labeled Tables A-H. Unidirectional arrows between the tables illustrate parent-child relationship through a foreign-key or interleaving between the tables, whereby certain rows of one table may be interleaved within rows of another table pointing to it. In the example of FIG. 1, Table A is shown as pointing to Tables B-H but none of Tables B-H point to Table A. In this regard, Table A may be treated as a root table, while the remaining Tables B-H may be treated as leaf tables relative to Root Table A. Additionally, Table B is a parent table to Table E, Table D is a parent table to Table F, and Table G is a parent table to Table H. The illustration is for the sake of examples, and it would be understood that a production database may include a different number of tables which may be related to one another in a different manner.

The illustration of Tables A-H in FIG. 1 is representative of a directed acyclic graph, in which each table is represented by a node and the interleaving between tables is generalized as an arrow between the interleaved tables. For the sake of simplicity, the arrows are shown between the tables, although it should be understood that the interleaving is between specific rows of each of the tables. Also, although not shown in FIG. 1, after the production data has been copied from the production database to the test environment, a complete copy of the Tables A-H and interleaving may also be stored within the test environment.

The one or more computing devices 100 for copying the production data to the test environment 104 may include one or more processors 110, servers, shards, cells, or the like. It should be understood that each computing device may include any number of processors or computing devices, and that the number of such devices in the computing devices 100 may vary over time, for example, as hardware is removed, replaced, upgraded, or expanded. The processor 110 can be a well-known processor or other lesser-known types of processors. Alternatively, the processor 110 can be a dedicated controller such as an ASIC.

The computing devices 100 may also include memory 120, and other components typically present in general purpose computers. The memory 120 can store information accessible by the processor 110, including data 130 that can be retrieved, manipulated or stored by the processor 110. The memory 120 can also include instructions 140 that can be executed by the processor 110. The memory 120 may be a type of non-transitory computer readable medium capable of storing information accessible by the processor 110, such as a hard-drive, solid state drive, tape drive, optical storage, memory card, ROM, RAM, DVD, CD-ROM, write-capable, and read-only memories.

The data 130 may include a representation of the DAG 132, which represents the production data stored in the production database 102. The DAG 132 may be represented as rows and edges, representing the multiple tables and interleaving in the production database. Alternatively, the DAG may be sorted, such that the root table is positioned at a top of the sorted table and leaf tables are positioned below according to the directed arrows of the DAG. Sorting the DAG into a sorted table can inform an order in which future operations are carried out on the production data. For instance, data positioned higher up of the sorted table, which is from a respective parent node of the DAG, can be copied before data positioned lower down in the sorted table, which is from a respective child node of the DAG. Copying data in the order of the sorted table can avoid missing key errors during the copying process.

The data 130 may further include information about each of the respective tables of the DAG, such as a respective size of each table. Size may be measured according to bytes per row 134. Knowing the interleaving between tables and bytes per row of each table can be used to determine an actual row size for the root node or a given parent node of the DAG, since a given row of the root or parent table includes not only the data in the root or parent table but also the data of the interleaved leaf or child tables.

The data 130 may further include information for balancing the data in the sorted table into approximately even sections. For instance, split points 136 indicating a split between the end of one section of the sorted table and the beginning of a next section of the sorted table may be stored in the data 130. Use of split points 136 can permit for even division of the table so that approximately equal portions of data can be copied in parallel. Maintaining a balanced division of the data for copying improves an overall efficiency of the components copying the data in parallel.

FIG. 2 illustrates an example sorted table 200 derived from the DAG shown in the production database 102 of FIG. 1. Each line of the sorted table 200 corresponds to a line of root Table A, as indicated in the Root Table column of the sorted table 200. The Interleaved Table(s) column indicates the particular leaf tables that are interleaved for each given line of root Table A. For instance, the first line of Table A is interleaved with lines of Tables B and E, and the last line of Table A is interleaved with lines of Tables G and H.

The sorted table 200 is further divided or split into smaller subsets of approximately even size. The split points may be determined based on one or more of several factors. One factor may be an estimated table size of each of the tables in the production database. The table size may indicate a number of bytes per row in the table, whereby the overall size of individual rows in the root table—including the interleaved tables—may be approximated. Additionally or alternatively, a factor of the split points may be existing split points in the production database, or other information from which a preferred split point location may be inferred. The existing split points and other information may indicate a preferred location for splitting the data. For example, in FIG. 2, the first split point may be in a preferable location because it is between rows of the root table that are interleaved with only Tables B, E, D, G and H, and rows of the root table that are additionally interleaved with Table F. Placing the split point between these two rows, as opposed to one row below for instance, may avoid the need for Table F to be accessed while handling operations on the first subset of the sorted table 200. This can reduce write hotspots and, in turn, improve write throughput, during data copying operations. Such split points may be inferred from the interleaving data, or may already exist in the production database.

Additionally or alternatively, a factor for generating split points may be a number of available worker nodes for copying data of the production database to the test environment. For example, if there are N available workers to copy the data, then it may be desirable to divide the production database into N approximately even subsets, meaning that N−1 split points should be selected. Additionally or alternatively, the number of split points generated may be fully or at least partially determined by a predefined shard size, whereby each subset of the sorted table is meant to be kept within the predefined size or within a specified range of the predetermined size. The split points may be calculated based on the number of available worker nodes, whereby each worker node may be assigned an approximately equal size of the production database to copy. Alternatively, split points may be computed in advance based on a predetermined preferred size for each subset. Using a predetermined size is advantageous when there is no restriction in the number of workers used, as scaling up/down the number of workers may improve the efficiency of copying as well as resource usage.

The Key Range column of the sorted table 200 indicates a key range assigned to each corresponding subset of rows in the sorted table 200. Since some rows of the root table may be interleaved with more leaf tables, and since some interleaved tables may have a greater table size than other interleaved tables, the key range for each subset may not be equal. However, the split points between each key range may be arranged so that the size of each subset may be about equal.

Returning to FIG. 1, the instructions 140 may include each of a data partitioning routine 142 for processing the DAG and sorting the production data into a sorted table such as the table 200 shown in FIG. 2. The instructions 140 may further include a database sharding routine 144 for dividing the production data into approximately equal shards to be processed in parallel with one another. In some instances, the instructions 140 may further include a database presplitting routine 145 for predetermining split points within the production data, such as based on information obtained from the production data.

Figure 3:
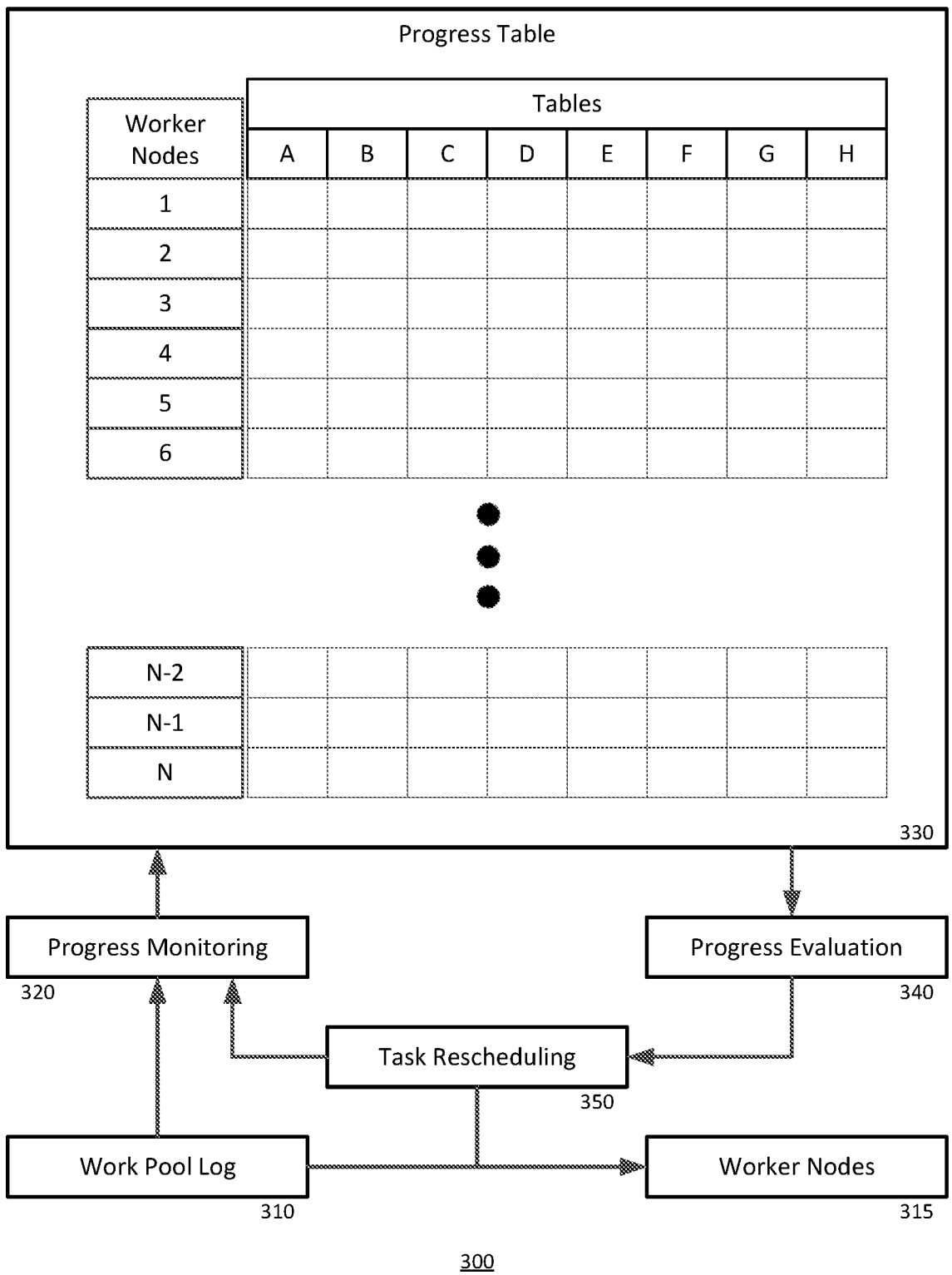
FIG. 3 is a functional block diagram of an example copying subsystem of the system of FIG. 1.

The instructions 140 may further include a task scheduling and monitoring routine 146 for assigning production data to worker nodes to be copied from the production database to the test environment, and monitoring progress of the scheduled tasks. An example task scheduling and monitoring routine 146 is illustrated in the flow diagram 300 of FIG. 3.

In the flow diagram 300, the subsets of the production data are logged in a work pool log 310. Each entry in the work pool log may be assigned by the task scheduling and monitoring routine 146 to a respective worker node 315 for copying from the production database to the test environment. The number of entries in the work pool log may be greater than or equal to the number of worker nodes 315. At block 320, the task scheduling and monitoring routine 146 may monitor progress of the respective assigned tasks. Monitored progress may indicate how much of the data from a given table from the production database has been copied by a given worker node 315. The monitored progress may be stored in a table, such as the example progress table 300 shown in FIG. 3. The progress table 330 is of size M×N, in which M corresponds to the number of tables from which data in the production database is being copied, and N is the number of worker nodes 315 assigned to perform the copying. Each cell of the table may track the progress of a respective worker node 315 on copying data from a respective table. Since each worker node is assigned to an independent key range, each cell of the progress table also corresponds to an independent key range. In this manner, progress of the copying can be tracked for each worker node 315 and for each table of the production database.

At block 340, the task scheduling and monitoring routine 146 may evaluate the progress of the copied data. For instance, if copying by one of the worker nodes 315 is lagging behind the other nodes for each of the assigned tables, this may indicate that the worker node 315 is working slower than expected. Alternatively, if copying of one table is lagging behind the other tables for each of the worker nodes 315, this may indicate that the table is larger than approximated or that access to the table is slower. At block 350, the task scheduling and monitoring routine 146 may reschedule tasks based on the progress evaluation 340. For instance, in the case of one or more failed or lagging worker nodes 315, tasks may be reassigned or migrated from the failed or lagging worker nodes 315 to other worker nodes 315 that are on pace or ahead of pacing for copying the data. Conversely, if one or more worker nodes 315 are ahead of pace, data from other worker nodes 315 could be assigned to the faster worker nodes 315 to improve overall efficiency. For further instance, in the case of one or more production tables for which progress is lagging, additional worker node resources may be concentrated on those tables in order to improve overall efficiency. Conversely, if one or more tables are being copied faster than the other tables, worker node resources may be redistributed away from those tables to improve the overall efficiency. In other instances, tables may be reassigned for purposes of concurrency control. The task scheduling and monitoring routine 146 may monitoring progress of the reassigned tasks and the progress table 330 may updated to reflect the reassignments.

Returning to FIG. 1, the instructions, may include a data batching routine 148 for copying data from the production database to the test environment in batches. A mutation pool may be used for effective batching. A predetermined threshold value for flushing the mutation pool may be determined in advance of the batching, and when a new mutation-to-be-added crosses the threshold, the pool may be flushed collectively. The size of a mutation may itself be approximated based on the pre-computed estimate of bytes-per-row for the production tables. Batching and then transferring the data in batches improves overall efficiency of the transfer process, especially for large data transfers.

The computing devices 100 may further include input/output communication devices and protocols 150 for direct and indirect communication with the production database 102 and the test environment, as well as with other computing devices, client devices, or any combination thereof, over a communications network. The communications network may include various configurations and protocols including the Internet, World Wide Web, intranets, virtual private networks, wide area networks, local networks, private networks using communication protocols proprietary to one or more companies, Ethernet, WiFi (e.g., 702.71, 702.71b, g, n, or other such standards), and RPC, HTTP, and various combinations of the foregoing. For example, production data may be received from the production database 102 by the communication devices 150 for processing at the one or more computing devices 100. For further example, data received from the production database 102 may be copied and transferred to the test environment 106 by the one or more computing devices.

Example Methods

Figure 4:
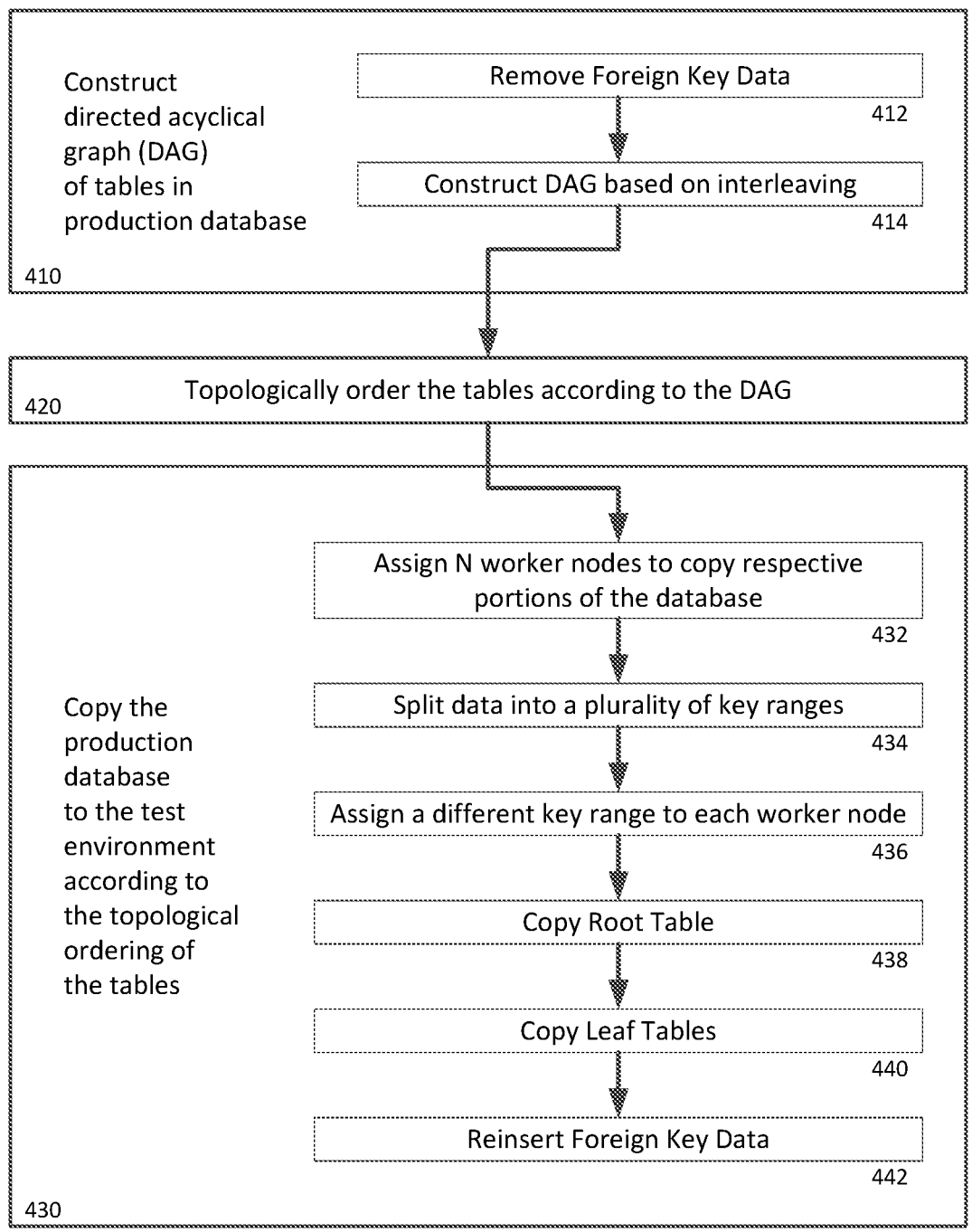
FIG. 4 is a flow diagram of an example routine for copying a production database to a test environment in accordance with an aspect of the disclosure.

FIG. 4 is a flow diagram illustrating an example routine 400 for copying a production database to a test environment. The routine 400 may be executed by one or more computing devices, such as the computing devices of the example system 100 of FIG. 1. The routine 400 is meant as an example, and in other implementations of the example system 100 certain steps may be performed simultaneously, in a different order, or omitted entirely, other steps may be added, or any combination of the above.

At block 410, the one or more computing devices construct a DAG from the tables of production data in the production database. The nodes of the DAG may represent tables of the production database, while edges of the DAG may represent interleaving between specific rows of the tables. In some instances, the production database may include additional constraints defining relationships between the tables, such as foreign keys. These constraints, like table interleaving, can impact the required loading order of the production data. Accounting for both interleaving and these additional constraints in the copying process may result in cyclic dependency challenges, and further may slow down the writing process during copying. One approach to avoiding these problems is to disregard the additional constraints during the copying process and then reinsert the constraints after the copying process is complete. As an example, at block 412, foreign key enforcement data from the production database is removed. As a result, at block 414, only interleaving data is used to construct the DAG.

At block 420, the one or more computing devices may topologically order the tables of the production database according to the DAG. This may involve sorting the tables to place a root table at the top of the topological ordering and leaf tables underneath.

At block 430, the one or more computing devices may copy the production database to the test environment according to the topological ordering of the tables. Following the topological ordering may be necessary to avoid missing key errors in the test environment The copying may be performed by multiple worker nodes, each assigned a different key range of data from the production database to copy. For example, at block 432, N worker nodes are assigned to copy respective portions of the production database. The number N may be determined based on a number of available worker nodes, an estimated size of the production data, or a combination thereof. At block 434, the data from the production database may be split into a plurality of subsets, each having its own respective key range that does not overlap with the key ranges of the other subsets. The subsets may be split approximately evenly based on estimates of the data size of the tables in the production database being divided up. At block 436, each different subset and its corresponding key range may be assigned to a respective worker node for copying. Copying begins at block 438 with all or at least some of the root table being copied in according with the ordering in the topologically ordered table from block 420. Copying may continue or end at block 440 with copying of the respective leaf tables that are interleaved with the root table. Finally, for production data having foreign key enforcement data that was previously removed, at block 442, the foreign key enforcement data may be reinserted at the test environment.

Figure 5:
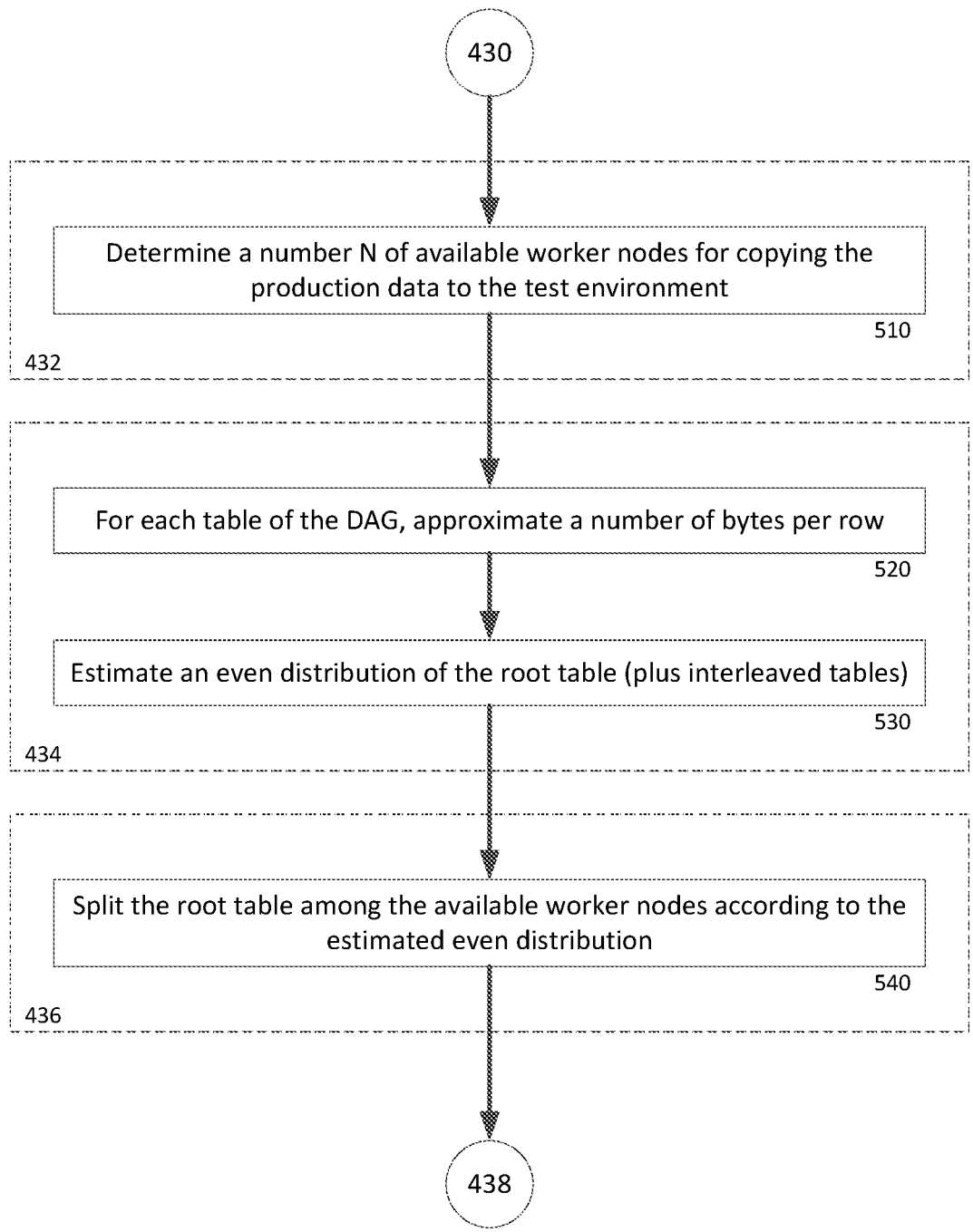
FIG. 5 is a flow diagram of an example subroutine of the routine of FIG. 4.

FIG. 5 illustrates an example subroutine 500 of the routine 400 of FIG. 4. The subroutine may be used to determine split points for dividing the production data approximately evenly among the N worker nodes. At block 510, a number of available worker nodes for copying the production data to the test environment is determined.

Additionally, at block 520, for each table of the DAG, an approximate number of bytes per row is estimated, and at block 530, a balanced distribution of the root table, plus all interleaved tables, is estimated. In some examples, the query "APPROX_QUANTILES" may be used to perform the estimation of blocks 520 and 530. This query has the advantage of avoiding heavy pre-computation. In other words, the decrease in efficiency from approximating table sizes through "APPROX_QUANTILES" is less than the increase in efficiency achieved from avoiding heavy pre-computation.

At block 540, the root table may be split among the available worker nodes according to the distribution determined at blocks 520 and 530. The worker nodes may operate in parallel and independent of one another to read and copy data from the production database. Parallel processing of the production data further increases efficiency of the copying process.

The above example systems and methods may be implemented in various production data environments that support constraints that interrelate tables of the production data to one another in an acyclical manner, such as interleaving. For example, the systems and methods may be implemented in a distributed database management and storage service, such as a Spanner database. Services that offer a guaranteed service level objective (SLO) for read and write operations, such as Spanner, can also provide greater reliability for copying production data. Additionally, services such as Spanner that allow users to divide and prioritize jobs, as opposed to sending all jobs to a single queue, provide users with more control over the copying operations and reduce the likelihood of production data becoming clogged, such as may happen in a common queue. Testing of the example systems and methods on a Spanner database yielded data loading speeds up to 8 times better than alternative TPC-H standards.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order, such as reversed, or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of copying a production database to a test environment, wherein the production database comprises a plurality of tables and one or more constraints indicating interleaving of the plurality of tables, the method comprising:

constructing, by one or more processors, a directed acyclic graph (DAG), wherein each of the plurality of tables is represented by a respective node of the DAG and interleaving of the plurality of tables is represented by edges of the DAG;

topologically ordering, by the one or more processors, the plurality of tables of the production database according to the DAG;

isolating, by the one or more processors, foreign key enforcement data from the one or more constraints of the production database;

assigning, by the one or more processors, a plurality of worker nodes to copy respective portions in parallel, wherein each worker node is responsible for copying the data from the plurality of tables of the production database from its respective portion;

copying, plurality of worker nodes, the data from the plurality of tables of the production database to the test environment according to the topological ordering of the plurality of tables, wherein each worker node copies its respective assigned portion of the data; and reinserting, by the one or more processors, the foreign key enforcement data after copying the data from the production database to the test environment.

2. The method of claim 1, wherein copying data from the production database to the test environment according to the topological ordering of the plurality of tables comprises copying data from a root table of the plurality of tables before copying data from leaf tables of the plurality of tables.

3. The method of claim 1, further comprising: wherein the plurality of worker nodes to copy respective portions of the data comprises assigning, by one or more processors, a respective key range to each of the plurality of workers, wherein each worker node is responsible for copying data from the plurality of tables of the production database within its respective key range.

4. The method of claim 3, further comprising:
generating, by the one or more processors, a progress table;
monitoring, by the one or more processors, a progress of copying the production database to the test environment for each cell of the progress table; and
in response to the monitored progress, rebalancing, by the one or more processors, at least one of the balanced distribution of key ranges or the assignment of the plurality of worker nodes.

5. The method of claim 1, further comprising:
for a given table of the test environment, writing data from the production database to a mutation pool associated with the given table of the test environment; and
in response to a size of a transaction of the mutation pool's contents to the given table of the test environment meeting or exceeding a threshold transaction value, flushing the mutation pool.

6. The method of claim 1, wherein the production database is a Spanner database.

7. A method of copying a production database to a test environment, wherein the production database comprises a plurality of tables and one or more constraints indicating interleaving of the plurality of tables, the method comprising:
constructing, by one or more processors, a directed acyclic graph (DAG), wherein each of the plurality of tables is represented by a respective node of the DAG and interleaving of the plurality of tables is represented by edges of the DAG;
topologically ordering, by the one or more processors, the plurality of tables of the production database according to the DAG;
assigning, by the one or more processors, a plurality of worker nodes to copy respective portions of the data from the production database to the test environment in parallel;
estimating a respective number of bytes-per-row for each of the plurality of tables of the production database; and
determining a balanced distribution of key ranges among the plurality of worker nodes based on the estimated number of bytes-per-row for each of the plurality of tables;
assigning, by the one or more processors, a respective key range of the balanced distribution of key ranges to each of the plurality of workers, wherein each worker node is responsible for copying data from the plurality of tables of the production database within its respective key range; and copying, by the one or more processors, data from the production database to the test environment according to the topological ordering of the plurality of tables.

8. The method of claim 7, wherein the balanced distribution of key ranges is based further on a number of available worker nodes, wherein the balanced distribution of key ranges splits the data of the production database into a number of portions greater than or equal to the number of available worker nodes.

9. The method of claim 7, wherein the balanced distribution of key ranges is based further on a preset value, wherein the preset value indicates a desired key range between split points.

10. A system for copying a production database to a test environment, wherein the production database comprises a plurality of tables and one or more constraints indicating interleaving of the plurality of tables, the system comprising:
memory storing a representation of a directed acyclic graph (DAG), wherein each of the plurality of tables is represented by a respective node of the DAG and interleaving of the plurality of tables is represented by edges of the DAG; and
one or more processors configured to:
isolate foreign key enforcement data from the one or more constraints of the production database;
isolate, by the one or more processors, foreign key enforcement data from the one or more constraints of the production database;
topologically order contents of the plurality of tables of the production database according to the DAG;
assign, by the one or more processors, a plurality of worker nodes to copy respective portions in parallel, wherein each worker node is responsible for copying the data from the plurality of tables of the production database from its respective portion;
copying, plurality of worker nodes, the data from the plurality of tables of the production database to the test environment according to the topological ordering of the plurality of tables, wherein each worker node copies its respective assigned portion of the data; and
reinsert the foreign key enforcement data after the plurality of workers copy the data from the production database to the test environment.

11. The system of claim 10, wherein the one or more processors configured to instruct each of the plurality of worker nodes to copy data from a root table of the plurality of tables before data from leaf tables of the plurality of tables.

12. The system of claim 10, wherein the one or more processors are configured to:
wherein each respective portion of the data corresponds to an independent key range, and wherein the independent key ranges do not overlap with one another.

13. The system of claim 12, wherein the one or more processors are configured to:
generate a progress table indicating a progress of each of the plurality of worker nodes copying the plurality of tables, wherein each cell of the progress table corresponds to a respective key range of the data; and
rebalance the assigned respective portions of the data among the worker nodes based on the progress indicated by the progress table.

14. The system of claim 13, wherein the one or more processors are configured to write data from the production database to a mutation pool, wherein each respective key range is separately batched, and wherein the mutation pool is configured to flush the data written to the mutation pool to the test environment upon meeting or exceeding a threshold transaction value.

15. The system of claim 10, further comprising the plurality of worker nodes, wherein the plurality of worker nodes are configured to operate independent of one another.

16. A system for copying a production database to a test environment, wherein the production database comprises a plurality of tables and one or more constraints indicating interleaving of the plurality of tables, the system comprising:

memory storing a representation of a directed acyclic graph (DAG), wherein each of the plurality of tables is represented by a respective node of the DAG and interleaving of the plurality of tables is represented by edges of the DAG; and one or more processors configured to:

The system of claim 14, wherein the one or more processors are configured to:

topologically order contents of the plurality of tables of the production database according to the DAG;

estimate a respective number of bytes-per-row for each of the plurality of tables of the production database; and determine a balanced distribution of key ranges among the plurality of worker nodes based on the estimated number of bytes-per-row for each of the plurality of tables;

assign respective portions of data from the production database to a plurality of worker nodes, wherein each respective portion of the data corresponds to an independent key range of the balanced distribution of key ranges, and wherein the independent key ranges do not overlap with one another; and instruct the plurality of worker nodes to copy the data from the production database to the test environment according to the topological ordering of the plurality of tables.

17. The system of claim 16, wherein the one or more processors are configured to determine the balanced distribution of key ranges based further on a number of available worker nodes, wherein the respective portions of the data is greater than or equal to the number of available worker nodes.

18. The system of claim 16, wherein the one or more processors are configured to determine the balanced distribution of key ranges based further on a preset value, wherein the preset value indicates a desired key range between split points.

* * * * *